United States Patent [19]

Marom et al.

[11] Patent Number: 5,306,899
[45] Date of Patent: Apr. 26, 1994

[54] AUTHENTICATION SYSTEM FOR AN ITEM HAVING A HOLOGRAPHIC DISPLAY USING A HOLOGRAPHIC RECORD

[75] Inventors: Emanuel Marom; Joseph Katz, both of Stony Brook, N.Y.

[73] Assignee: Symbol Technologies, Inc., Bohemia, N.Y.

[21] Appl. No.: 897,761

[22] Filed: Jun. 12, 1992

[51] Int. Cl.⁵ .......................... G06K 7/10; G06K 5/00
[52] U.S. Cl. ................... 235/382; 235/457; 235/454; 235/487; 235/462; 359/2
[58] Field of Search ................ 359/2; 235/494, 457, 235/454, 462, 436, 437, 438, 380, 487, 382; 380/24; 340/825.34

[56] References Cited

U.S. PATENT DOCUMENTS

| | | | |
|---|---|---|---|
| 3,704,949 | 12/1972 | Thomas et al. | 359/2 |
| 3,894,756 | 7/1975 | Ward | 359/2 |
| 4,041,279 | 8/1977 | Foote | 235/454 |
| 4,150,781 | 4/1979 | Silverman et al. | 359/2 |
| 4,269,473 | 5/1981 | Flothmann et al. | 359/2 |
| 4,641,017 | 2/1987 | Lopata | 235/457 |
| 4,684,795 | 8/1987 | Colgate, Jr. | 235/457 |
| 4,873,426 | 10/1989 | Sarna et al. | 235/462 |
| 4,889,366 | 12/1989 | Fabbiani | 283/86 |
| 4,945,215 | 7/1990 | Fukushima et al. | 235/457 |
| 4,963,756 | 10/1990 | Quan et al. | 235/472 |
| 4,988,154 | 1/1991 | Hansen | 359/22 |
| 5,059,776 | 10/1991 | Antes | 359/2 |
| 5,095,194 | 3/1992 | Barbanell | 359/2 |
| 5,138,468 | 8/1992 | Barbanell | 359/2 |
| 5,145,212 | 9/1992 | Mallik | 283/86 |

Primary Examiner—Donald Hajec
Assistant Examiner—Esther Chin

[57] ABSTRACT

In order to improve security for holographic labels which are positioned on a substrate base, a bar code symbol is holographically recorded on the base such as a credit card, a label, or a container for a product. A reading apparatus (e.g., a bar code reader) directs light at the holographic bar code symbol and detects the reflected optical information with a detector such as a CCD array. The reading apparatus can be a stand-alone device or, in the case of a credit card, can be incorporated into a conventional swiper for reading magnetic information on a strip on the card. A non-holographic bar code symbol can also be provided on or near a holographic display element, e.g., a rainbow hologram. The bar code can be positioned adjacent the display, or placed in a window within the display, or etched or embossed on the display. A system is also provided for authenticating a holographic display on an information card such as a credit card. A display is illuminated and a reflected beam directed at a holographic record which was previously produced from a signal, known to be authentic, and a reference. The reflected beam is used to reconstruct a reference beam. A sensor receives the reconstructed reference and it is then determined if the display is authentic.

10 Claims, 4 Drawing Sheets

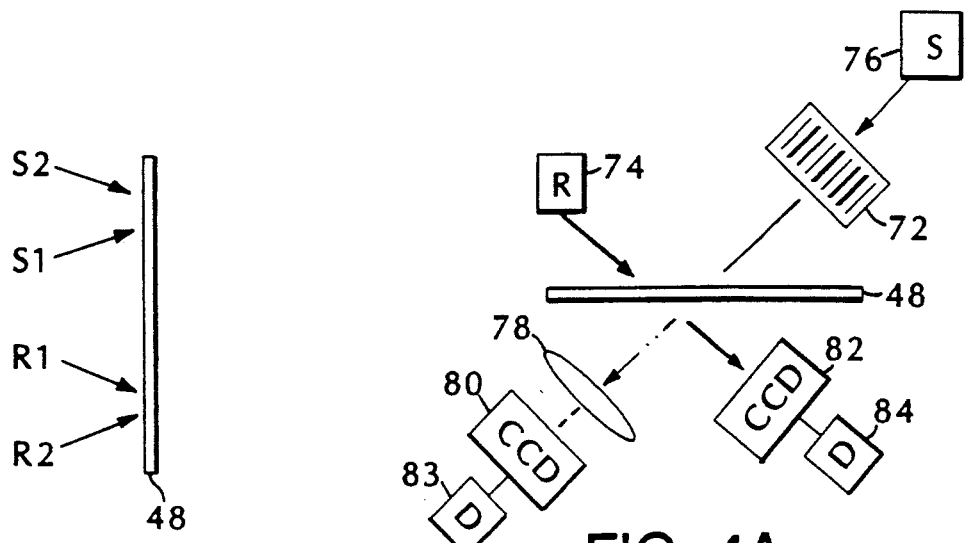
FIG. 4
FIG. 4A
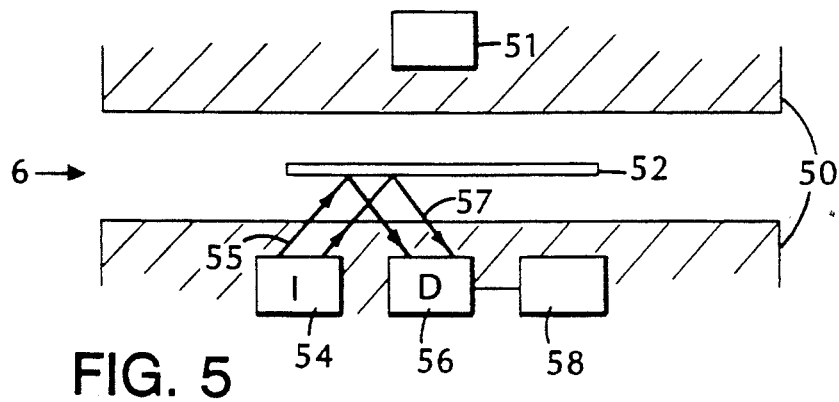
FIG. 5
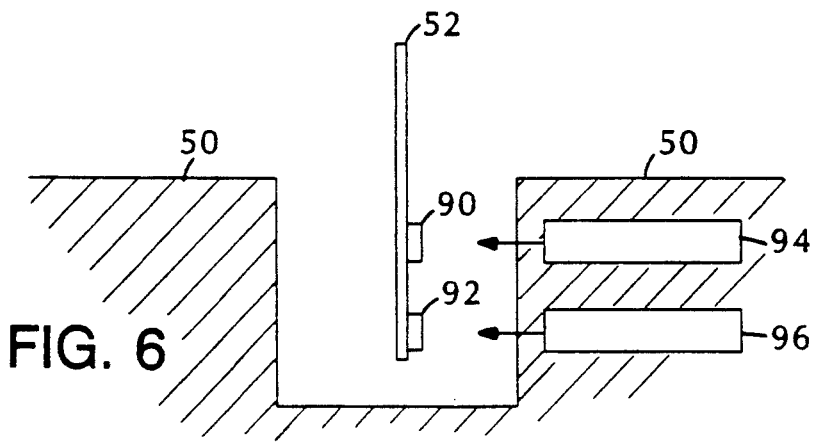
FIG. 6
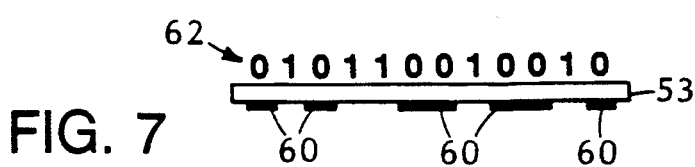
FIG. 7

AUTHENTICATION SYSTEM FOR AN ITEM HAVING A HOLOGRAPHIC DISPLAY USING A HOLOGRAPHIC RECORD

This application is related to the copending Katz et al. application entitled "Bar Code Incorporated Into Holographic Display" filed on even date herewith.

BACKGROUND OF THE INVENTION

This invention relates to holographic display elements used for authentication.

In order to discourage fraudulent manufacture of information cards, and particularly credit cards, card manufacturers have been incorporating a holographic pattern or display on the face of the cards. A hologram is a recording of an interference pattern between two beams of light, usually referred to as the signal beam and the reference beam. The signal beam usually includes the image to be recorded, and the reference beam is a beam of light, usually of constant distribution, i.e., plane or spherical wavefront. Typically, another reference beam which is similar, but not necessarily identical, to the one used to record the hologram, is used to reconstruct the signal beam, which then produces an identifiable image. For most holograms, one cannot identify the recorded image without reconstruction.

The holograms typically used on credit cards are what are known as rainbow holograms. They are produced by placing the image to be recorded near the surface of the holographic substrate during recording. These holograms are visible in ordinary, white light and are familiar to many holders of credit cards. The rainbow hologram can be mass produced on sheets of metallized embossing substrate, and stamped onto a credit card. Such holograms are a deterrent to counterfeiting because their production requires an expensive manufacturing investment. Counterfeiting is still a potential problem, however, because with a large enough investment in equipment counterfeit holograms can be produced. Moreover, detecting a counterfeit hologram may be difficult, because of the inherent difficulty of accurately comparing two holograms with just the naked eye.

SUMMARY OF THE INVENTION

The invention features a method and apparatus for automatically authenticating a holographic display element on an information card. A holographic record is made using a reference beam and a signal beam, where the signal beam could be reflected light from a display element known to be authentic. To authenticate a display, light is directed at the display and the reflected beam is directed to the record. The light passing through the record is directed to a detector, such as a CCD array camera, which receives the light pattern and determines, with appropriate circuitry, whether this light pattern indicates an authentic display. This holographic record, referred to as a matched filter, generates the correlation or resemblance between the stored pattern and the illuminated pattern. For a discussion of matched filters, see J.W. Goodman, *Introduction to Fourier Optics*, McGraw-Hill (1968).

The authentication apparatus may be a stand-alone system or may be incorporated in a magnetic swiper frequently used with information cards such as credit cards. The authentication apparatus may also be combined with a bar code reader. The invention allows quick automatic authentication without relying on a merchant to determine an authentic or non-authentic display. If incorporated in a swiper, the merchant would not have to perform extra steps to perform the authentication.

Other features and advantages of the invention will be apparent from the following description of a preferred embodiment, and from the claims.

BRIEF DESCRIPTION OF THE DRAWINGS

FIG. 4 is a pictorial view of two reference beams and two signal beams.

FIG. 4A is a schematic of an apparatus to reconstruct a bar code holographically recorded.

FIG. 5 is an optical reader within a magnetic swiper channel.

FIG. 6 is a pictorial view of a card in a swiper channel without magnetic and optical readers, taken through plane 6 of FIG. 5.

FIG. 7 is a pictorial representation of an identification card with gratings.

DESCRIPTION OF THE PREFERRED EMBODIMENTS

Figure 1:
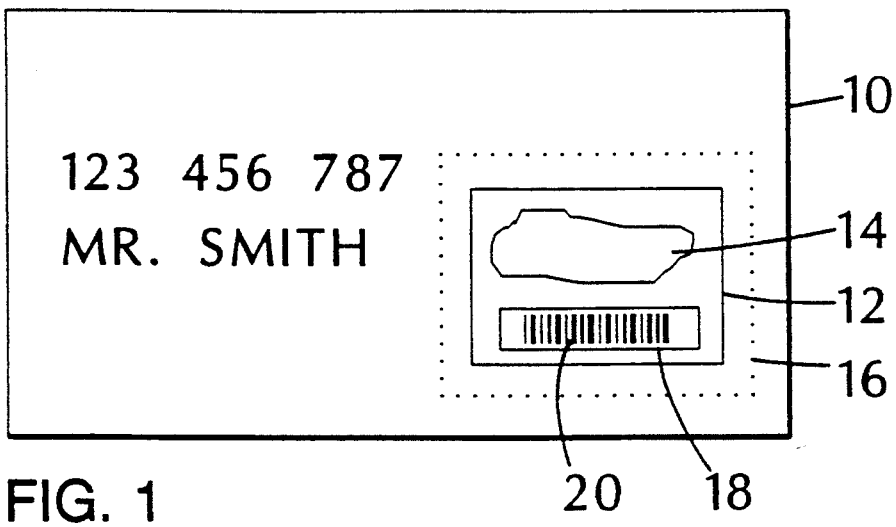
FIGS. 1-3 are pictorial representations of holographic displays with incorporated bar code.

Referring to FIG. 1, holographic display element 12 is positioned on a substrate base, for example, a credit card 10. Display element 12 is a rainbow hologram with an image 14 embossed as an interference pattern in a polymeric film. The image, which may be of most any form, has a three-dimensional appearance. Display element 12 has a window 18 which is cut out of the display, and a symbol with regions of different light reflective properties, such as bar code symbol 20, is printed in this window. The combination of display element 12 and bar code symbol 20 is covered by transparent lamination cover 16.

Figure 2:
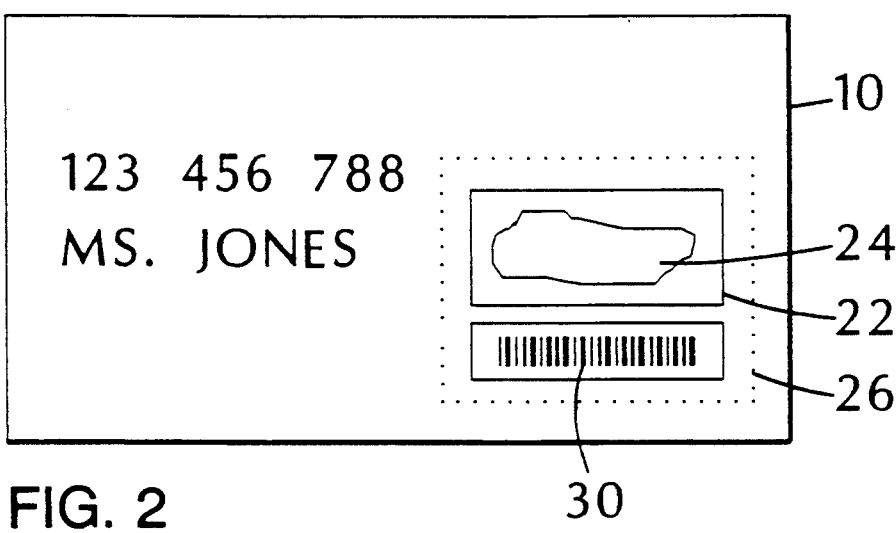

In the embodiment in FIG. 2, credit card 10 includes display element 22 with image 24. Bar code symbol 30 is positioned next to display element 22. The image and bar code are covered together with transparent lamination cover 26. With this arrangement of bar code symbol and display element, there is no need to cut the polymeric film forming the holographic display element.

Figure 3:
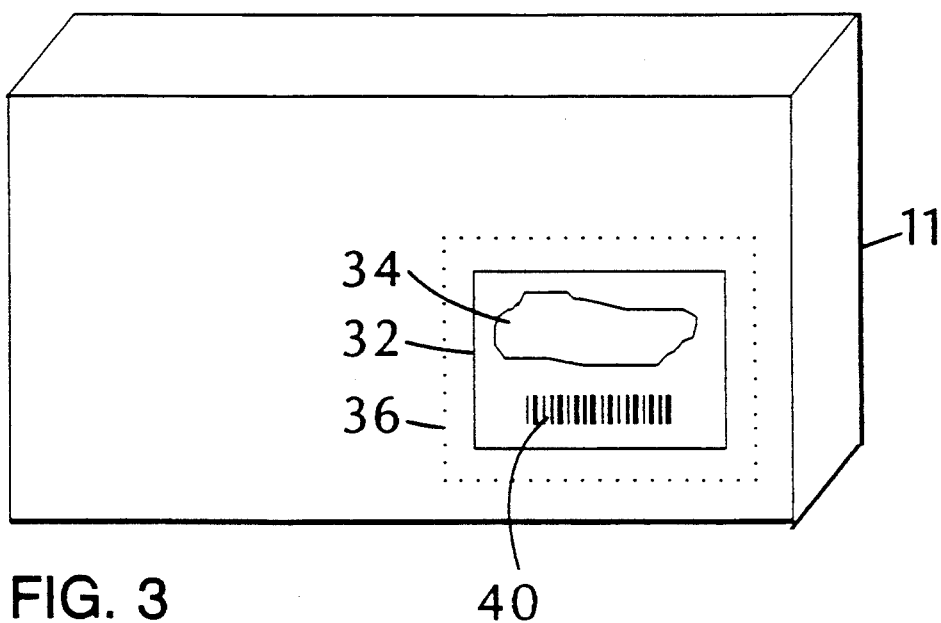

FIG. 3 shows a display element 32 with image 34 and a bar code 40 which has been printed directly on top of the polymeric film of the holographic display, and positioned on a box 11. The bar code could be printed on a specially prepared area reserved for a bar code, or even directly on top of the holographic region of the polymeric film. The bar code 40 could also be etched or embossed in the polymeric film, rather than printed. In this case, the density of the etching or embossing should be lower than that of the holographic process so that the information carried by the barcode could be easily separated.

These embodiments have several advantages. The holographic display element can be mass produced and stamped onto a credit card, or on some other object, such as a product container, at relatively low cost. The bar code symbol can be added easily, and can include individual information specific to each card or product. A conventional flying spot scanner can be used to read the bar code symbol without interference from the holographic process, and the bar code symbol does not interfere with the holographic display element.

Referring to FIG. 4, a bar code is holographically recorded on the holographic display along with another object. Two references, R1 and R2, and two corresponding signals, S1 and S2, are represented in the recording stage of forming a hologram 48. To holographically record S1, reference bean Ri is directed at holographic material of hologram 48. When reconstructed, R1 is again directed at the hologram and the image S1 is reconstructed. Two objects, corresponding to S1 and S2, can both be holographically recorded separately or at the same time. Either S1 or S2 can be reconstructed, depending on which reference, R1 or R2, is directed at the hologram. Thus S2 can represent some image, such as an eagle, and S1 a bar code symbol, or vice versa.

The bar code symbol can be recorded like another rainbow hologram, i.e. near the surface and visible in white light, or embossed on the polymeric film. Alternatively, the bar code could be recorded so that it is only detectable when a particular reference beam is directed toward the display, while another image on the display is recorded to be visible in white light. This approach, however, would require different recording techniques and may make the hologram more difficult to manufacture or replicate.

Referring to FIG. 4A, hologram 48 includes a holographic bar code made from reference source 74 and signal source 76 illuminating at bar code 72. To reconstruct, a reference beam from reference source 74 is directed at the hologram and the reconstructed beam is received by a detection apparatus at 80 or 82 if the substrate is transparent. If a CCD camera is used at detection position 80, preceded by relay lens 78, a virtual image can be detected. The virtual image appears as if it were at the previous location of bar code 72. If a real image is desired, it can be observed by a CCD camera at detection position 82. The detection apparatus, whether receiving a real or virtual image, also includes appropriate circuitry 83 or 84 for electro-optically converting the information received at the CCD camera to a series of electrical signals which are decoded and converted to characters.

Frequently, identification cards, such as credit cards, have a magnetic information strip which is read by being swiped through a channel that includes a magnetic reading apparatus. Referring to FIG. 5, an optical reader is positioned within a magnetic swiper channel with magnetic reading apparatus represented generally at 51. Card 52 is shown between two sides of swiper 50. An illumination source 54 directs a beam or series of beams 55 at a holographic record in the form of a reflective strip (not shown) alongside the strip or possibly superimposed over the strip. The reflected beams 57 are received by CCD array detector 56, and information is converted to electrical signals by circuitry 58. Other optical elements, such as lenses (not shown), could also be included.

A side view of the apparatus of FIG. 5 is shown in FIG. 6 (not drawn to scale), which shows card 52 in the swiper channel with side walls 50. Card 52 has optically readable symbol 90 and magnetic stripe 92. Within the side 50 is an optical detector 94 and magnetic information detector 96. As this FIGURE indicates, both sets of information can be positioned on the card with a compatible reading apparatus for reading both optically and magnetically encoded data. The readers could also be in different walls, so that the optically readable information can be on one side of the card, and magnetic on the other since many credit cards have holographic displays and magnetic stripes on reverse sides of the card. Alternatively, the optical reader could be mounted on top of the swiper thus increasing the height of sidewalls 50. This system could be used with a non-holographic bar code symbol or with a holographically produced bar code symbol used to provide added information or to authenticate the display.

FIG. 7 shows a side view of a credit card 53 with gratings 60 (not drawn to scale). Using a similar apparatus as that shown in FIG. 5, these gratings will produce reflected bursts of light which can be read in a manner similar to a bar-type code, i.e. a sequence of zeros and ones corresponding to dark and light as represented at 62. If gratings are used, a motorized swiper can be used to direct the card at a constant rate, or a separate parallel set of equally spaced gratings for synchronization purposes can be added which also produce bursts. Either option would improve the reading since the location and length of each burst is important.

Figure 8:
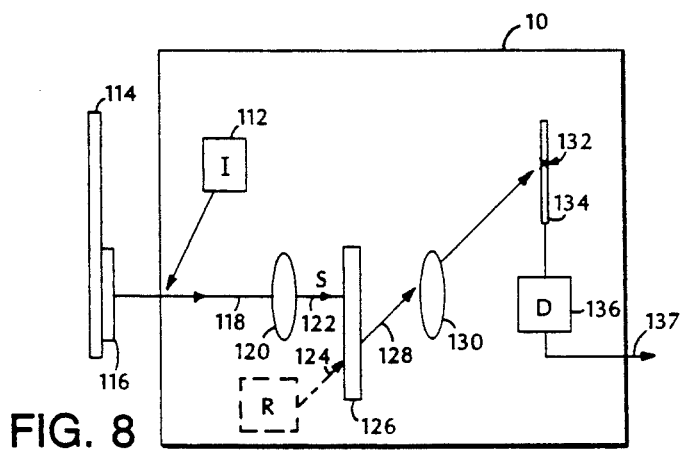
FIG. 8 is a pictorial representation of a system to authenticate a holographic display.

FIGS. 8-11 show a holographic authentication system 110. Referring to FIG. 8, the authentication system includes an illumination source 112, preferably a laser diode or a light emitting diode, which is positioned to direct a beam of light to credit card 114, which includes holographic display element 116. Reflected beam 118 is focused by lens 120, and results in signal beam 122, which is thus directed to holographic record 126.

Holographic record 126 has been prepared in advance with a reference beam 124, represented in phantom, and from a signal beam produced from a holographic display element which was known to be authentic or valid. Holograms are often used to reconstruct a signal beam by directing the reference beam at the hologram. In this case, however, signal beam 122 is used in an attempt to reconstruct reference beam 124. Beam 128, which is the reconstruction of the reference beam actually produced by directing signal beam 122 at the record 126, is essentially a beam that carries the correlation of the two signals. This beam is focused by lens 130 onto CCD array sensor 134. The light distribution received by sensor 134 is evaluated by detection circuitry 136, which determines from the presence of a strong signal whether the pattern indicates an authentic display and outputs a result represented at 137.

Figures 9A, 9B:
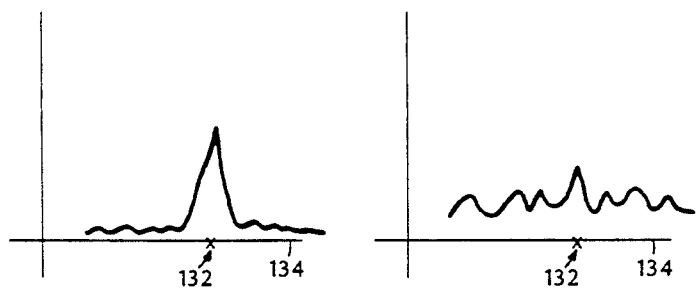
FIGS. 9A and 9B represent patterns that might appear in an image plane for an image with satisfactory and unsatisfactory correlation, respectively.

If signal beam 122 is sufficiently similar to the signal used to record holographic record 126, i.e., if the display element is authentic, then the reconstructed reference beam 128 will essentially be the original reference beam 124 used to record the holographic record multiplied by the correlation between the stored and observed targets. Furthermore, a location point 132 can be identified where the reconstruction of the reference beam would be expected. FIGS. 9A and 9B illustrate light distribution patterns that arise at CCD array sensor 134 for authentic and non-authentic elements, respectively. A sharp peak in the light distribution pattern at point 132, as shown in FIG. 9A, indicates a strong correlation between the beam 122 used in recording the hologram and that used as the read-out. Referring to FIG. 9B, a light distribution pattern which lacks a significant peak at point 132 indicates poor cross-correlation between the object and the reconstruction beams. In this case, the signal beam 122 reflected from holographic display element 116 is unacceptably different from the signal beam used to make holographic record 126, and therefore the display element is considered non-authentic.

Figure 10:
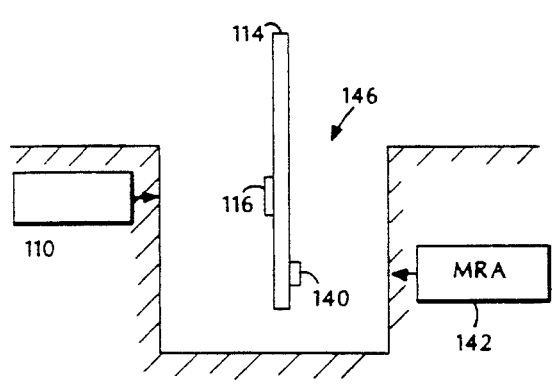
FIGS. 10 and 11 are pictorial views of an optical authentication apparatus in or adjacent a magnetic swiping channel.

Referring to FIG. 10 (not drawn to scale), information card 114 includes holographic display element 116 and magnetic stripe 140 which includes individual cardholder and other information. A magnetic reading apparatus 142 reads the magnetic information when card 114 is swiped through swiper channel 146. Optical authentication apparatus 110 (FIG. 8) is also positioned in the swiper channel to authenticate the hologram during the same swiping action.

Figure 11:
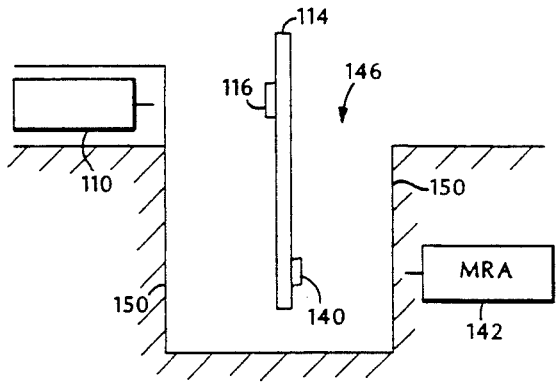

FIG. 11 shows a similar apparatus to that in FIG. 10 except that the authentication apparatus 110 is positioned over the sidewalls 150 of the channel, rather than within one sidewall. The authentication apparatus 110 could also be a stand-alone system, and not incorporated in another device.

The hologram authentication features of the embodiments of FIGS. 8-11 can be combined with features of the embodiments of FIGS. 1-7.

Figure 12:
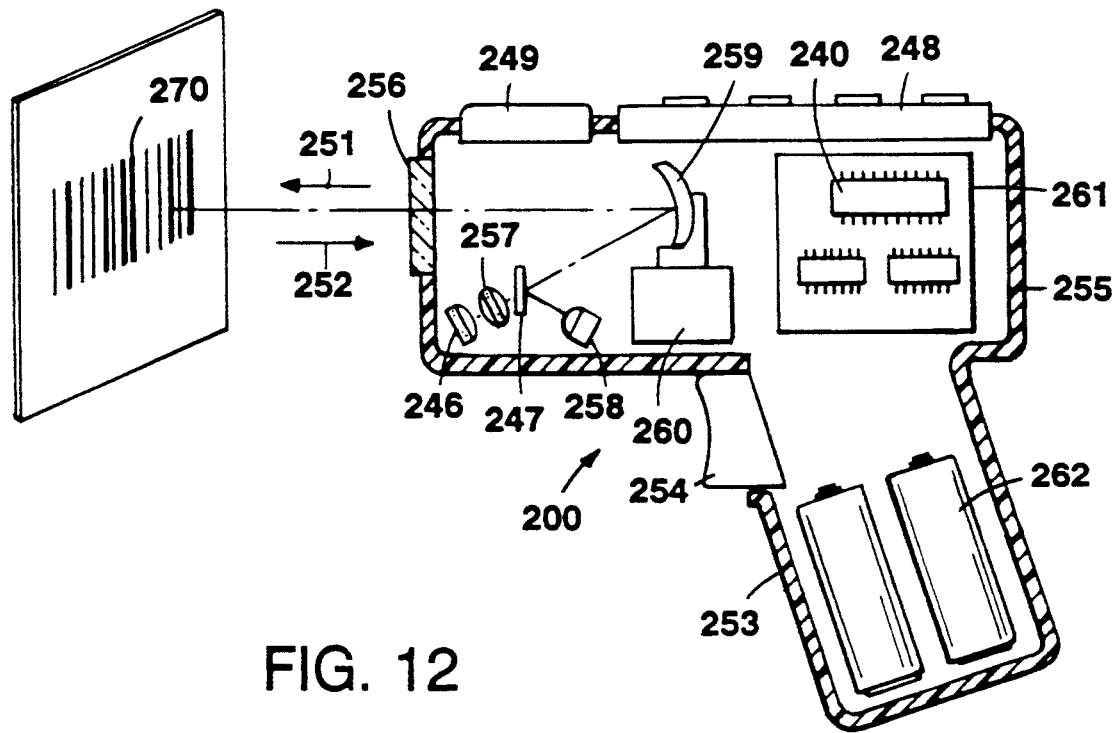
FIG. 12 is a diagrammatic view of a bar code reader.

Bar code readers of the general type shown in FIG. 12 could be adapted to read bar code symbols incorporated into holographic displays, and to incorporate the above-described hologram authentication apparatus.

FIG. 12 illustrates a typical exemplary embodiment of a bar code reader unit 200 implemented as a gun shaped device, having a pistol-grip type of handle 253. A movable manually actuated trigger switch 254 is employed to allow the user to activate the light beam 251 and detector circuitry, typically after the time when the user has positioned the device to point at the symbol to be read. A lightweight plastic housing 255 contains the laser light source 246, the detector 258, the optics and signal processing circuitry and the CPU 240, as well as a power source or battery 262. A light-transmissive window 256 in the front end of the housing 255 allows the outgoing light beam 251 to exit and the incoming reflected light 252 to enter. The reader 200 is designed to be aimed at a bar code symbol by the user from a position in which the reader 200 is spaced from the symbol, i.e., not touching the symbol or moving across the symbol. Typically, this type of hand-held bar code reader is specified to operate in the range of perhaps several inches or even further.

The reader 200 may also function as a portable computer terminal, and in such embodiments includes a keyboard 248 and a display 249, such as described in U.S. Pat. No. 4,409,470.

As further depicted in FIG. 12, a suitable lens 257 (or multiple lens system) may be used to focus the scanned beam into a scanning spot at an appropriate reference plane. A light source 246 such as a semiconductor laser diode is positioned to introduce a light beam into the axis of the lens 257, and the beam passes through a partially-silvered mirror 247 and other lenses or beam-shaping structure as needed. The beam is reflected from an oscillating mirror 259 which is coupled to a scanning motor 260 which is energized when the trigger 254 is pulled. If the light produced by the source 246 is marginally visible, an aiming light may be included in the optical system. The aiming light if needed, produces a visible-light spot which may be fixed, or scanned just like the laser beam; the user employs this visible light to aim the reader unit at the symbol before pulling the trigger.

Other embodiments of the invention are within the scope of the following claims.

What is claimed is:

1. A method for authenticating an item, said item having a holographic display element on one surface, said method comprising the steps of:
   illuminating said holographic display element;
   directing light reflected from said holographic display element to a holographic record, wherein said holographic record is a holographic recording made using an authentic version of said holographic display element and a reference beam, said light passing through said holographic record to form a correlation beam that carries a correlation signal of said holographic display element and said authentic version of said holographic display element;
   direction said correlation beam to a sensor; and
   determining from said correlation beam whether said holographic display element is authentic, the width and intensity of said correlation beam providing an indication of whether said holographic display element is authentic or non-authentic.

2. The method of claim 1 wherein said holographic display element is a rainbow hologram.

3. The method of claim 1 wherein said item is an information card.

4. An apparatus for authenticating an item, said item having a holographic display element on one surface, said apparatus comprising:
   an illumination source for directing light to said holographic display element to produce a reflected beam from said display element;
   a holographic record, wherein said record is a holographic recording made using an authentic version of said holographic display element and a reference beam, said holographic record being positioned to receive said reflected beam so that said reflected beam passed through said holographic record to form a correlation beam that carries a correlation signal of said holographic display element and said authentic version of said holographic display element;
   a sensor positioned to receive said correlation beam; and
   means for determining from the output of the sensor whether said display element is authentic by examining said correlation beam.

5. The apparatus of claim 4 wherein said sensor induce a CCD array and wherein said means for determining includes electronic circuitry.

6. The apparatus of claim 4 wherein said item is an information card and said apparatus is configured for authenticating a holograph display element on one surface of said card.

7. The apparatus of claim 6 wherein said apparatus is positioned in a device for reading information from a magnetic stripe on said information card.

8. A bar code reader, comprising
   symbol detection means for generating a laser beam directed toward a symbol to be read on a target and for receiving reflected light from such symbol to produce electrical signals corresponding to the intensity of the reflected light; and apparatus for authenticating a holographic display element on one surface of said target, said apparatus comprising an illumination source for directing light to said holographic display element to produce a reflected beam from said display element;

a holographic record, wherein said record is a holographic recording made using an authentic signal version of said holographic display element and a reference beam, said holographic record being positioned to receive said reflected beam so that said reflected beam passes through said holographic record to form a correlation beam that carries a correlation signal of said holographic display element and said authentic version of said holographic display element;

a sensor positioned to receive the correlation beam; and means for determining from the output of the sensor whether said display element is authentic by examining said correlation beam.

9. A bar code reader of claim 8 wherein said symbol detection means comprises a flying spot scanner.

10. A bar code reader of claim 8 wherein said symbol comprises a holographically recorded bar code.

* * * * *